INVENTOR
ISAY BALINKIN,
BY Yungblut, Melville, Strasser and Foster
ATTORNEYS

INVENTOR
ISAY BALINKIN,

BY Yungblut, Melville, Strasser and Foster
ATTORNEYS

INVENTOR
ISAY BALINKIN,

BY Yungblut, Melville, Strasser and Foster
ATTORNEYS

INVENTOR/S
ISAY BALINKIN,
BY Melville, Strasser, Foster and Hoffman
ATTORNEYS

Feb. 4, 1969 I. BALINKIN 3,425,138

COLOR DEMONSTRATION DEVICE

Filed Dec. 14, 1967 Sheet 5 of 5

INVENTOR/S

ISAY BALINKIN,

BY Melville, Strasser, Foster and Hoffman

ATTORNEYS

United States Patent Office 3,425,138
Patented Feb. 4, 1969

3,425,138

COLOR DEMONSTRATION DEVICE

Isay Balinkin, 1337 N. Bend Road, Cincinnati, Ohio 45224

Continuation-in-part of application Ser. No. 562,643, July 5, 1966. This application Dec. 14, 1967, Ser. No. 697,261
U.S. Cl. 35—28.3 19 Claims
Int. Cl. G09b *1/32*

ABSTRACT OF THE DISCLOSURE

A demonstration device for certain additive and subtractive color phenomena comprising a plurality of filter elements. Means are provided whereby the interaction of light from a source and the individual filter elements, a combination of any two of the filter elements and the combination of all of the filter elements may be observed. Diffraction grating means may be associated with the device in such a way that the above mentioned observations may be made with respect to the spectrum of the light source. Means may also be provided in association with each filter element for indicating the transmittance thereof.

CROSS-REFERENCE TO RELATED APPLICATIONS

This application is a continuation-in-part of the copending application in the name of the same inventor, Ser. No. 562,643, filed July 5, 1966, and entitled, Color Demonstration Device.

BACKGROUND OF THE INVENTION

*Field of invention*

The invention relates to a classroom or other demonstration device, and more particularly to a device for demonstrating certain additive and subtractive color phenomena.

*Description of the prior art*

A study of color, as seen by the eye, necessarily involves a study of two basic processes, additive and subtractive. When light, reaching the eye, has been modified by interaction with other light, the additive process is involved. On the other hand, when light reaching the eye has been modified by interaction with matter (i.e. light reflected by a surface or light transmitted by a filter) the subtractive process is involved. When light has been subjected to more than one interaction with matter before reaching the eye (as for example light passing through two or more filters), we may speak of such light as a subtractive color mixture.

Heretofore, color demonstration devices were generally complex in structure and relatively expensive to manufacture. The device of the present invention is extremely simple, easy and inexpensive to manufacture, and suitable for use by an individual student as well as for classroom demonstrations. The device is capable of demonstrating the subtractive process, as well as subtractive color mixtures, and by means of the subtractive process of color mixture can be caused to simulate colors which would be produced by an additive process. The device is made up of a plurality of light-transmitting filters by which the subtractive effect of each filter and various combinations of filters as well as the transmittance curve for each filter may be demonstrated. The device is also capable of demonstrating both the subtractive and additive primary colors.

SUMMARY OF THE INVENTION

The invention contemplates the use of two or more filter elements so positionable with respect to each other that light from a light source may be caused to pass through one or more of the filter elements before it reaches the viewer. Means may also be provided for causing portions of the light source to pass through each of the filter elements individually, while other portions of the light from the light source pass through a combination of two or more of the filter elements.

For purposes of an exemplary showing, certain of the embodiments of the invention will be described as comprising three filters pivotally affixed to each other. It will be understood that the invention is intended not to be so limited and the filters, for example, need not be physically joined together or they may be permanently and non-pivotally affixed to each other. Whether or not the filters are physically joined by any suitable means, the distance between two or more juxtaposed filters through which light is viewed simultaneously is not a limiting factor of the invention, nor is the number of filters.

In one embodiment three filter elements are pivotally joined together in such a way that any two or all three of the filters may be juxtaposed. The filter elements are provided with a first set of cooperating holes so located that when two or more of the filters are juxtaposed the filtering action of the juxtaposed filters and each filter individually may be observed. A second set of holes are provided in the filter elements, so located that when all of the filter elements are in juxtaposed position the filtering action of any two of the filter elements may be observed.

In a second embodiment, otherwise substantially similar to the first, each of the filter elements is provided with a cut out portion forming a representation of a transmissivity curve for that particular filter element. The cut out portions of the filter elements are superposable to obtain an indication of the resultant or combined transmissivities of two or more of the filter elements.

In a third embodiment, which may be otherwise substantially similar to the first or second embodiment, the filter elements are pivotally affixed to a base having three openings therethrough. Two of the openings contain diffraction gratings. The third opening is unobstructed. The parts are so assembled that one or more of the filter elements may be superposed on the base so as to cover one of the holes containing a diffraction grating and the unobstructed hole. Thus the spectrum of the light source, the spectrum as seen through the superposed filter element or elements and the light transmitted by the superposed filter elements or elements may be observed simultaneously.

A fourth embodiment of the demonstration device comprises a base member. The base member has a first large hole therein through which light from a source may be viewed through diffraction grating means.

A first series of large holes is provided in the base member, equal in number to the number of different filter elements employed. Through each large hole in the first series, light from the source may be viewed through one of the filter elements and a diffraction grating means. A small hole is located adjacent each large hole of the first series, through which light from the source may be viewed through the corresponding filter element alone.

A second series of large holes is provided in the base member equal in number to the number of possible pairs of filter elements. Through each large hole in the second series, light from the source may be viewed through one of the pairs of filter elements and a diffraction grating means. Two small holes are located adjacent each large hole of the second series, through which light from the source may be viewed through the corresponding filter elements of the pair individually.

A final large hole is provided in the base member through which light from the source may be viewed through a combination of all of the different filter elements employed and a diffraction grating means. A plurality of small holes, equal in number to the number of different filter elements employed, is located adjacent the final large hole through which light from the source may be viewed through each of the filter elements of the combination individually.

DESCRIPTION OF THE PREFERRED EMBODIMENTS

Figures 1, 2, 3, 4, 6:
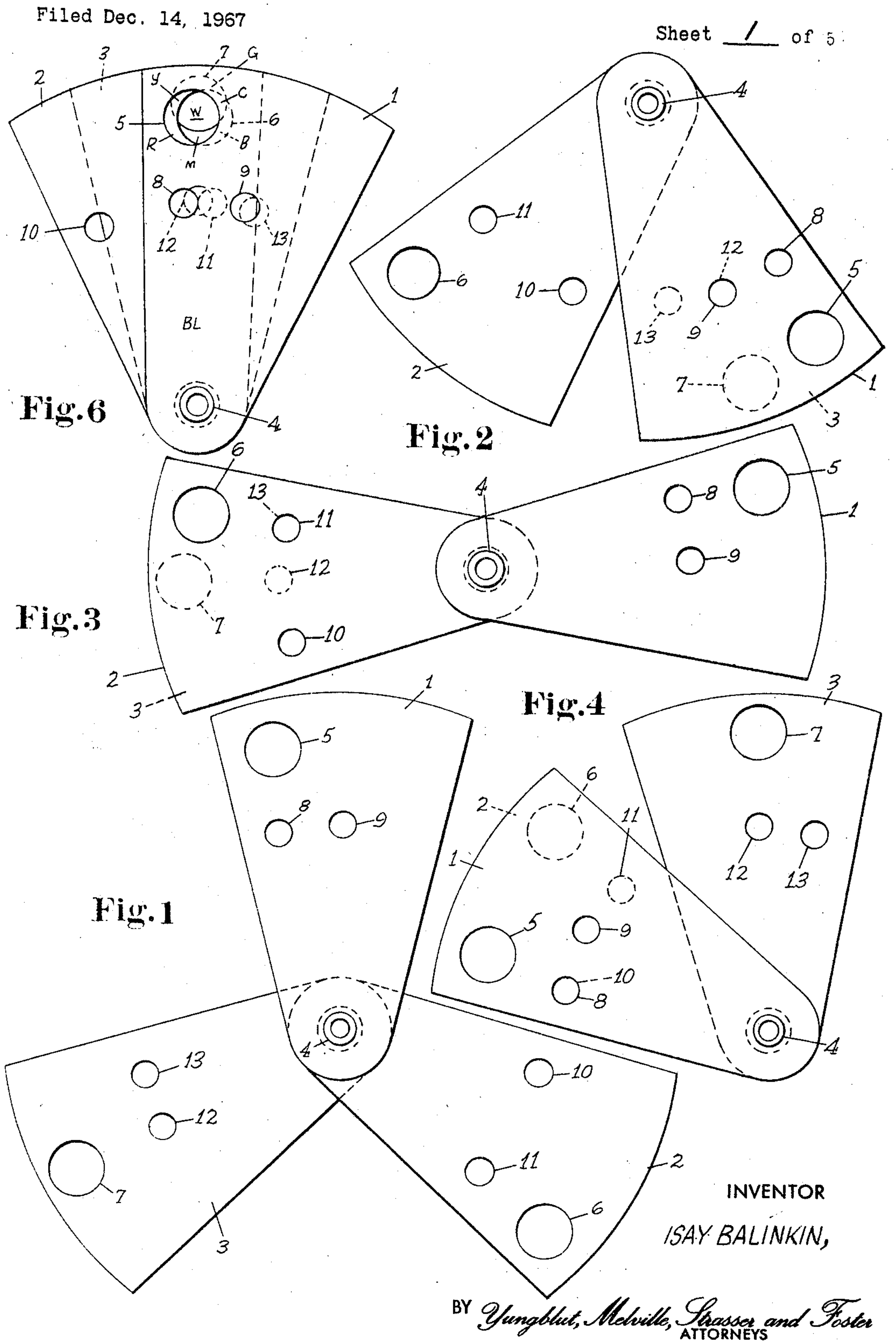
FIG. 1 is an elevational view of a first embodiment of the demonstration device of the present invention with the filter elements in none-superposed position.
FIGS. 2, 3 and 4 are elevational views illustrating the embodiment of FIG. 1 with various combinations of two of the filter elements in superposed position.
FIG. 6 is an elevational view illustrating the embodiment of FIG. 10 with all three filter elements superposed. in such a way as to demonstrate both the additive and subtractive primary colors, as well as the additive and subtractive mixtures of these primary colors.

Referring first to FIG. 1, the demonstration device shown therein comprises three color filter elements 1, 2 and 3 of the same size and pivotally joined together as at 4. The filters 1, 2 and 3 may be made of any suitable material capable of being handled without damage, as for example acetate, gelatin, glass, plastic or the like. The means by which the filters are pivotally joined does not constitute a limitation on the invention, but for purposes of an exemplary showing, the filters are illustrated as joined together by a grommet. The fact that the filters are pivotally joined enables any two of them to be superposed as shown in FIGS. 2, 3 and 4. Furthermore, all three filters may be partially or completely superposed as shown in FIGS. 5 and 6.

Each of the filters is provided with a large perforation near its arcuate outer end portion. Filter 1 is provided with a large perforation 5 to the left of its long axis. Filter 2 is provided with a large perforation 6 to the right of its long axis, and filter 3 is provided with a large perforation 7 located centrally of the filter, or on its long axis. For reasons given hereinafter, any two of the perforations 5, 6 and 7 should be equally distant from the pivot point 4, while the remaining perforation should be at a slightly greater distance from the pivot point. For purposes of an exemplary showing, perforations 5 and 6 are illustrated as being at a substantially equal distance from the pivot point 4, while perforation 7 is shown at a slightly greater distance therefrom.

As is further illustrated in FIG. 1, each of the filters is provided with two smaller perforations located radially near the pivot point. Thus filter 1 is provided with two small perforations 8 and 9 which are the same radial distance from the pivot point, perforation 8 lying to the left of the long axis of the filter, while perforation 9 lies on the long axis. Filter 2 is provided with two small perforations 10 and 11 which are again the same radial distance from the pivot point, perforation 10 lying to the left of the long axis of filter 2, and perforation 11 located to the right thereof. Filter 3 is provided with small perforations 12 and 13. Perforation 12 is located along the long axis of filter 3, while perforation 13 is located to the right thereof. All of the perforations 8–13 are located at equal radial distances from the pivot point 4.

Figures 5, 7, 8, 9, 10, 11, 12:
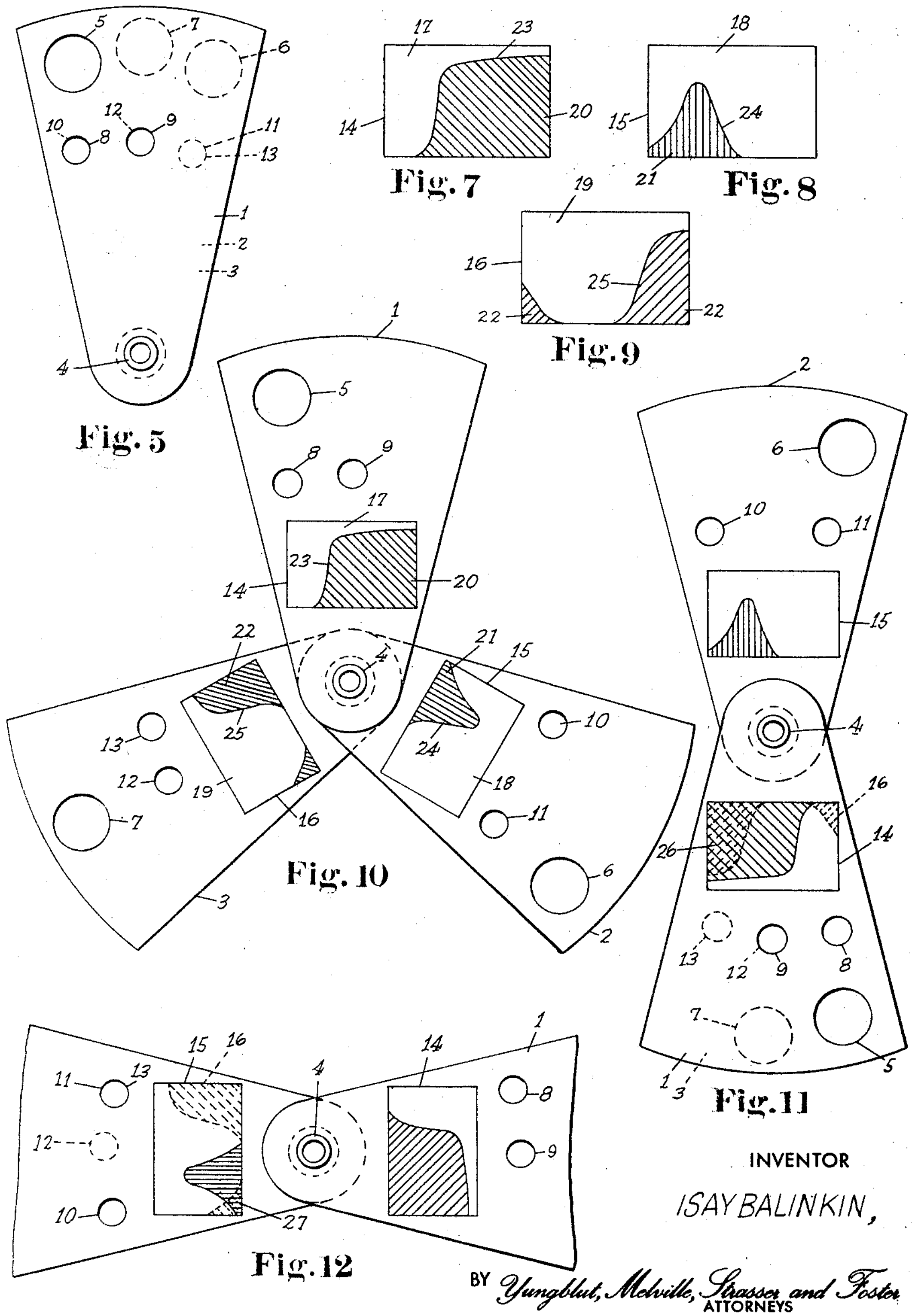
FIG. 5 is an elevational view illustrating the embodiment of FIG. 1 with all three filter elements superposed.
FIGS. 7, 8 and 9 illustrate typical transmissivity curves of the filter elements.
FIG. 10 is an elevational view of another embodiment of the demonstration device of the present invention with the filter elements in non-superposed position.
FIGS. 11, 12 and 13 are elevational views illustrating the demonstration device of FIG. 10 with various combinations of two of the three filter elements in superposed position.

FIG. 5 illustrates the demonstration device with the filters 1, 2 and 3 superposed, with filter 2 on top of filter 3 and filter 1 on top of filter 2. As indicated, when the filters are so superposed perforations 8 and 10 coincide as do perforations 9 and 12 and perforations 11 and 13; but there is no coincidence of three holes. It will further be evident from FIG. 5 that the large perforations 5, 6 and 7 are so located on their respective filters that when the filters are superposed these perforations will lie in substantially evenly spaced side by side relationship and do not coincide.

The elements 1, 2 and 3 have been described as filters, and by this is meant elements which have a subtractive effect upon white light so as to diminish or eliminate a certain wave length or wave lengths therein. The easiest and least expensive filter elements with which the invention may be practiced are elements formed of such a material as acetate or plastic sheeting which have been given the power to act as filters through the incorporation of appropriate dyes. Broadly speaking also, the number and shape of the elements is not a limitation on the invention; and a basic characteristic of the structure is the provision of a plurality of filter elements having perforations therein so positioned that if one allows light to pass through the superposed filters in the positions of the perforations, one will see the light as modified by any one of the filter elements. Also there should be yet another position or positions at which one will see the light as modified by at least two, but less than the total number of filter elements. Preferably, also there is a position at which the holes on all filters coincide when the filters are superposed so that white light from the source can be observed unmodified in the last mentioned position.

To particularize, assume a device made up as shown in FIG. 1 of three filter elements 1, 2 and 3. It will be evident that when the filters are all superimposed as shown in FIG. 5, light pasing through the bodies of the filters will be modified by the action of all three. Any two of the filters can be superposed as shown in FIGS. 2, 3 and 4; and it will be evident that light passing through the bodies of two superposed filters will be modified by both, but will not be modified by the third filter. When all three of the filter elements are completely superimposed as in FIG. 5, it will be evident from an examination of that figure that perforations 8 in filters 1 and 10 in filter 2 will coincide, so that light passing through the structure at this point will be modified only by filter 3. At another point perforation 9 of filter 1 coincides with perforation 12 of filter 3, so that light passing through at this point will be modified only by the body filter 2. Similarly, at the point where perforations 11 and 13 coincide, the light will be modified only by the filtering action of element 1.

It is well known that in subtractive light phenomena, where white light passes through a single filtering element it will generally take on a predominant hue perceptible to the eye. But the actual light passed may contain wave lengths of colors other than the predominant hue. For example, a particular filter which passes so much of the radiation in the yellow region as to give a yellowish hue to the transmitted light, may at the same time be passing substantial quantities of radiation in the red region. Another filter may pass so much light in the blue region of the spectrum as to appear to have a bluish cast, but at the same time may be passing some radiation in the red region. If the two filters just described are superimposed, and if the second filter will not pass the yellow region radiation passed by the first filter, the net result of superposing the filters and allowing white light to pass through the bodies of both will be the imparting of a red hue to the transmitted light. This is illustrative of the fact that when dealing with subtractive color phenomena one must take into account the spectral transmissivities of the several elements as filters, and it is possible depending on these spectral transmissivities to obtain transmitted light of substantially any hue. By "spectral transmissivity" is meant the percent of light transmitted by a given filter in different parts of the spectrum between 400 and 700 nanometers. If the device of this invention is intended primarily for the demonstration of subtractive color phenomena, the number of filter elements provided may be multiplied as desired.

But as has been stated above, the device of this invention is also well adapted to illustrate additive color phenomena by simulating it. In this event, three filter elements only need be provided. If the filter elements are so arranged that filter 1 passes light of magenta hue, filter 2 passes light of cyan hue, and filter 3 pases light of yellow hue, and if the filter elements have the proper light transmissivity, then it will be found that if light passes through the bodies of the magenta and cyan filters, it will take on a blue hue. Similarly, if light passes through the cyan and yellow filters it will take on a green hue. Light passing through the magenta and yellow filters will take on a red hue. This is well illustrated through the use of the three larger perforations 5, 6 and 7. Thus when the filter elements are superposed as in FIG. 5, the primary additive colors blue, green and red will be found in the areas of the perforations 5, 6 and 7 respectively. Similarly, the primary subtractive colors magenta, cyan and yellow will be shown in the areas of superposed perforations 8–10, 9–12 and 11–13 respectively.

It will be recalled that in the description above, the perforation 7 lies at a somewhat greater radial distance from the pivot point than perforations 5 and 6. By fanning the filter elements as shown in FIG. 6, it is possible to bring perforations 5, 6 and 7 almost, but not completely into coincidence. When this is done, there will be a central clear area marked W through which the unmodified white light will be transmitted, simulating the result of the addition of the additive primary colors. This central clear area will be surrounded by lunar shaped areas showing respectively the effects on the white light of the filter elements individually and in combinations of any two of them. These lunar areas are respectively marked C, Y and M signifying respectively cyan, yellow and magenta, and G, R and B signifying respectively green, red and blue.

Where the light must pass through all three of the filter elements, if these elements are properly chosen, substantially all of the light will be cut off signifying opacity or blackness. This is shown in the central area marked B*k* in FIG. 6 and shows the result of the addition of the subtractive primary colors.

The general importance of the transmissivities of the filter elements has been mentioned. The structure of this invention is well adapted to a specific illustration of these transmissivities. This may be done by providing generally rectangular areas 14, 15 and 16 in each filter element. These rectangular areas are adapted to come into coincidence when the filter elements are superimposed as in FIG. 14.

Each such area is in a form simulating a chart upon which the abscissa represents wave lengths of light which may for example range from about 400 to about 700 nanometers or any other range of wave lengths in the visible spectrum. The ordinate represents the percentage transmittance (relative energy of transmitted light). Each such area is cut away in part as at 17, 18 and 19, and also is provided with a remanent area of the filter body 20, 21 and 22 simulating a curve on the respective charts. For purposes of clarity, the remanent areas of the filters have been differently cross hatched.

In either event, it is possible by examining the chart representations on each individual filter element to obtain a graphic idea of the transmittance of that element; and it is also possible by superposing the chart representations of two or more elements to obtain an indication of the resultant or combined transmissivities of these elements, as they affect each other. In other words, if the transmissivity chart for yellow in FIG. 7 be superposed on the transmissivity chart for magenta illustrated in FIG. 9, it will be immediately apparent to the student that the yellow curve 23 of FIG. 7 will indicate a blocking of that portion of the shorter wave lengths which would be passed by the magenta filter element of FIG. 9, whereas the magenta filter of FIG. 9 as shown by the curve 25 will block the transmission of the greater part of the yellowish radiation which would be passed by the filter of FIG. 7. Both filters, however, have transmissivity in the red region, illustrating that the additive combination of yellow and magenta is red (see FIG. 11 at 26). Similarly it can be seen that a combination of the cyan filter of FIG. 8 having the transmissivity curve 24 with the magenta filter of FIG. 9 having the transmissivity curve 25 will have a combined transmissivity substantially confined to the blue region (see FIG. 12 at 27).

Figure 13:
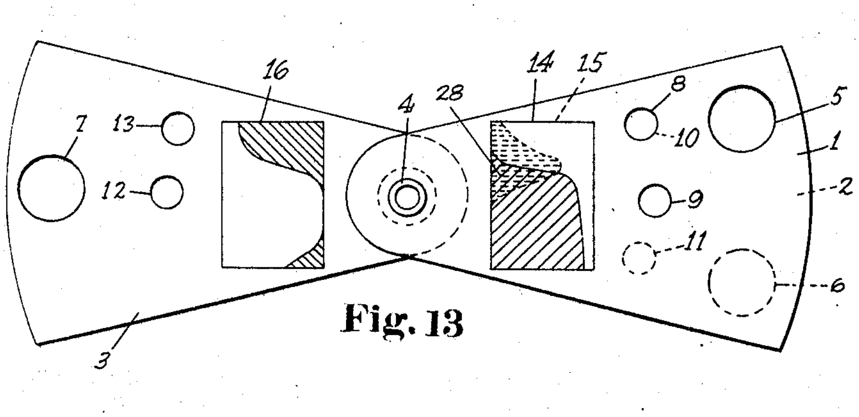
Figure 14:
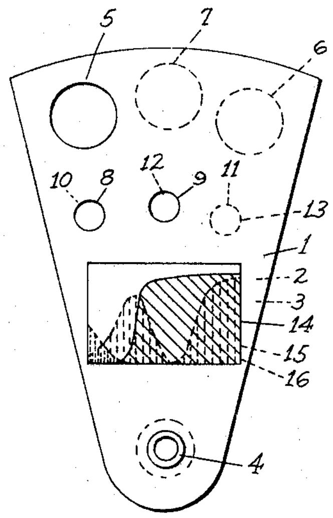
FIG. 14 is an elevational view illustrating the embodiment of FIG. 10 with all three filter elements superposed.

It is evident from FIG. 13 at 28 that superposition of the yellow and cyan filter elements will transmit light of a predominantly green hue. FIG. 14 indicates that when all three filter elements are superposed the combination will have substantially no transmissivity at all, giving the effect of black.

Figures 15, 16, 17, 18, 19, 20, 21:
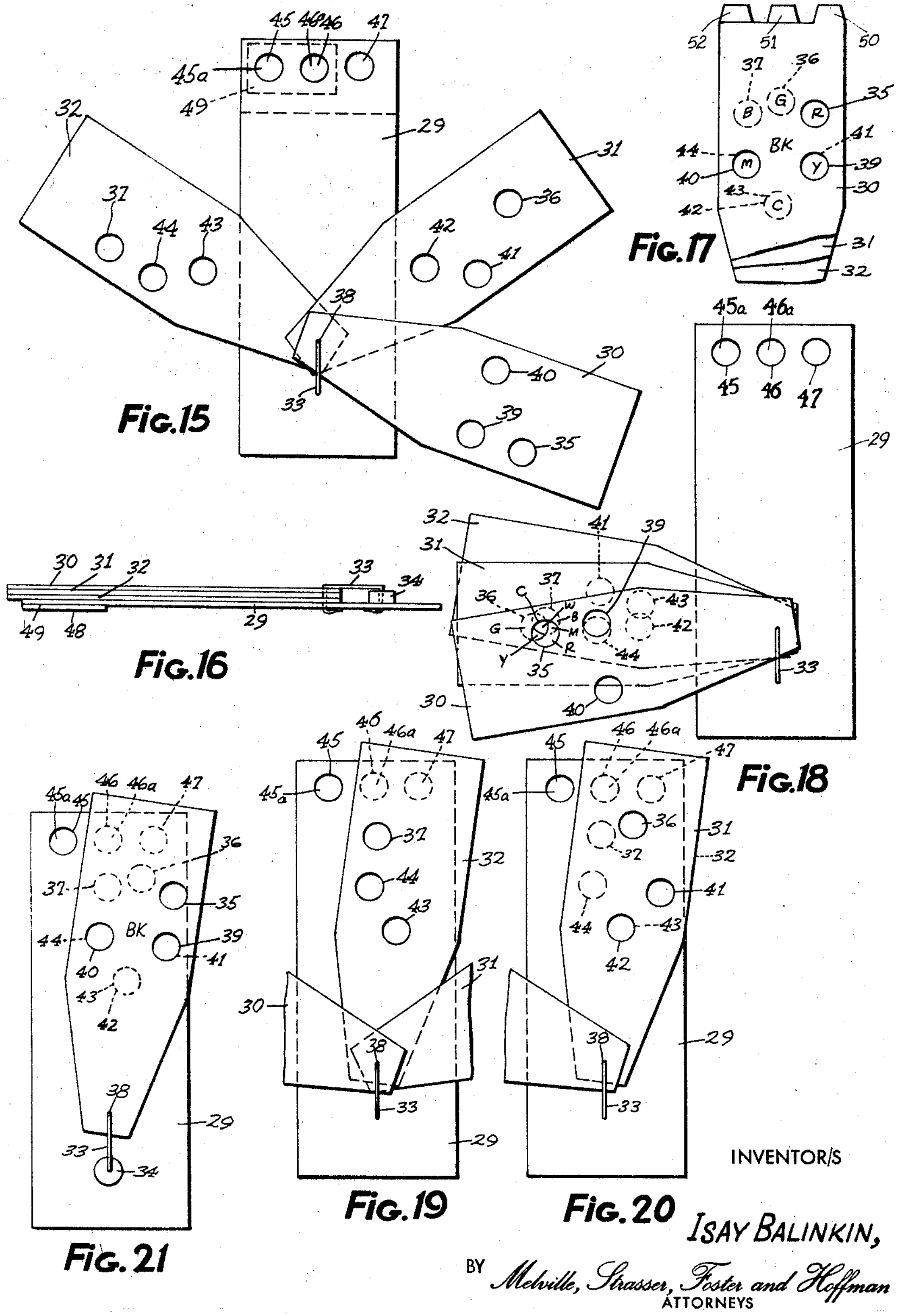
FIG. 15 is an elevational view of another embodiment of the demonstration device of the present invention with the filter elements in non-superposed position.
FIG. 16 is a side elevation of the embodiment of FIG. 15.
FIG. 17 is a fragmentary elevational view of the embodiment of FIG. 15 with all three filter elements superposed.
FIG. 18 is an elevational view of the embodiment of FIG. 15 with all three filter elements superposed in such a way as to demonstrate both the additive and subtractive primary colors, as well as the additive and subtractive mixtures of these primary colors.
FIGS. 19, 20 and 21 are elevational views of the embodiment of FIG. 15 illustrating respectively one, two and three filter elements superposed on the base in such a way as to cover the unobstructed hole and one of the holes containing a diffraction grating.

FIGS. 15–21 illustrate another embodiment of the present invention. Referring first to FIGS. 15 and 16, the demonstration device comprises a base 29 and three filter elements 30, 31 and 32. The three filter elements may be pivotally affixed to the base 29 by any suitable means such as a grommet of the type shown at 4 in FIG. 1. FIGS. 15–21, however, illustrate an alternative and less expensive pivot means. In this instance a common staple may be used, one leg of the staple passing through the three filters and the base, and the other leg of the staple passing through the base alone. When the filters 30, 31 and 32 are made of relatively thin material such as plastic sheet or the like, the staple alone will be found sufficient. When, on the other hand, the filter elements 30, 31 and 32 are of relatively thick material, that leg of the staple 33 which does not pass through the filters may be caused to pass through a spacer 34 substantially equal in thickness to the thickness of the three filters. Such a spacer is illustrated in FIGS. 16 and 21.

The filters 30, 31 and 32 are substantially equivalent to the filters 1, 2 and 3 of FIG. 1, and are intended to serve the same purpose. For purposes of an exemplary showing, the filter elements 30, 31 and 32 will be described as being so arranged that filter 30 passes light of a cyan hue, filter 31 passes light of a magenta hue, and filter 32 passes light of a yellow hue. Filters 30, 31 and 32 each have an uppermost perforation 35, 36 and 37 respectively. The perforations 35, 36 and 37 are intended to serve the same purpose as the perforations 5, 6 and 7 of the embodiment of FIG. 1. Again, two of the perforations 35, 36 and 37 are located at substantially the same radial distance from the pivot point 38, while the third perforation is located at a slightly greater radial distance. For purposes of an exemplary showing, perforations 35 and 37 are illustrated as being located at the same radial distance from the pivot point 38, while perforation 36 is located at a slightly greater radial distance from the pivot point. While not intended to be so limited, it is preferable that the difference in radial distance between the perforation 36 and the pivot point and the perforations 35 and 37 and the pivot point be equal to one-half of the diameter of the perforation 36 (assuming that perforations 35, 36 and 37 are of equal diameters).

As in the case of the embodiment of FIG. 1, when the filters 30, 31 and 32 are in superposed position (see FIG. 17) perforations 35, 36 and 37 will show the subtractive color mixtures of filters 31–32, 30–32 and 30–31 respectively. Thus, light passing through perforations 35, 36 and 37 will appear to be red, green and blue respectively. In this way, the demonstration device of FIGS. 15–21 may be made to illustrate the primary additive colors in the same way as the demonstration device of FIG. 1.

The filters 30, 31 and 32 are also provided with two additional perforations 39–40, 41–42 and 43–44 respectively. These perforations are similar to and intended for the same purpose as the perforations 8–9, 10–11 and 12–13 of FIG. 1. Thus, as is shown in FIG. 17, when the filter elements 30, 31 and 32 are in superposed position, perforations 39 and 41 coincide as do perforations 42 and 43 and perforations 40 and 44. Thus, light transmitted through perforations 39 and 41 will pass through filter element 32 and will have a yellow hue. Similarly, light passing through perforations 42 and 43 will pass through filter element 30 and have a cyan hue, and light passing through perforations 40 and 44 will pass through filter element 31 and have a magenta hue. In this way, the primary subtractive colors yellow, cyan and magenta will be shown in the areas of superposed perforations 39–41, 42–43 and 40–44 respectively. In those areas of the superposed filters where light must pass through all three of the filters, substantially all of the light will be cut off, signifying opacity or blackness (as is indicated by the letters B*k*).

It will be noted that, unlike the embodiment shown in FIG. 1, not all of the holes 39–44 are located at substantially the same radial distance from the pivot point 38. Nevertheless, since those holes which coincide when the filter elements are in superposed position do lie at the same radial distance from the pivot point 38, the effect is the same as described with respect to the embodiment of FIG. 1.

As illustrated in FIG. 18, the filter elements 30, 31 and 32 are capable of assuming the same fan-wise position described with respect to FIG. 6. In this position, perforations 35, 36 and 37 may be brought into partial coincidence. In this position, there will again be a central clear area marked W, through which the unmodified white light from the light source will be transmitted. This central area simulates the result of the addition of the additive primary colors. The central clear area W will be surrounded by lunar shaped areas showing respectively the effects on the white light of the filter elements 30, 31 and 32 individually, and in combinations of any two of them. As in the case of FIG. 6, these lunar areas are marked C, Y and M signifying respectively cyan, yellow and magenta, and G, R, and B signifying respectively green, red and blue.

As thus far described, it will be noted that filter elements 30, 31 and 32 are substantially equivalent to filter elements 1, 2 and 3 of FIG. 1, and serve substantially the same purpose. The major difference between the embodiment of FIGS. 15–21 and the embodiment shown in FIG. 1 is the provision of base member 29. Base member 29 may be made of any suitable material and is provided with three perforations 45, 46 and 47. The perforations 45, 46 and 47 are located at such a distance from the pivot point 38 that they maye be covered by the uppermost portions of filter elements 30, 31 and 32, but they are at a greater distance from the pivot point 38 than any of the perforations in the filter elements.

The perforations 45 and 46 in the base member are provided with diffraction gratings **45*a* and 46*a* respectively. This may be done in any suitable manner. For example, the outer end of the base 29 may be provided with a lamination 48 (see FIGS. 15 and 16). Between the base member 29 and the lamination 48 there may be located a single diffraction grating means 49 covering both perforations 45 and 46 to form the diffraction gratings 45*a* and 46*a*. Where desired, separate diffraction grating means may be used for each perforation 45 and 46**, and they may be affixed to the base in any desired manner.

The demonstration device of FIGS. 15–21 may be used to graphically demonstrate the subtractive color phenomena in the following manner. Referring to FIG. 19, it will be seen that any one of the filters 30, 31 and 32 may be caused to overlie perforations 46 and 47 in the base member 29. For purposes of an exemplary showing, filter element 32 is shown in this position, but it will be understood by one skilled in the art that filter element 30 or filter element 31 may be similarly positioned.

When the demonstration device as shown in FIG. 19 is held between the viewer and an appropriate light source, the spectrum of the light source may be viewed through the diffraction grating **45*a* in the base perforation 45. The spectrum of the light source may be simultaneously viewed through the diffraction grating 46*a* in the base perforation 46. In this instance, however, the spectrum of the light source will be modified by the overlying filter element 32. The unobstructed perforation 47 in the base member will show that portion of the light source transmitted by the overlying filter element 32**.

The spectrum viewed through diffraction grating **45*a*** may be designated by the following equation:

$$W=V+B+G+Y+O+R$$

In this equation W indicates the light source or white light and V, B, G, Y, O, R respectively indicate violet, blue, green, yellow, orange and red.

Where, for purposes of an exemplary showing, filter element 32 is a yellow filter of appropriate transmissivity, the spectrum viewed through diffraction grating **46*a*** may be stated as follows:

$$Y=W-(V+B)$$

In other words, the yellow filter element 32 will cut out or reduce transmission of the violet and blue portions of the spectrum viewed through base perforation 46, and will transmit the yellow portion of the spectrum together with some green, orange and red. The net result may be viewed through base perforation 47 wherein the light transmitted will have an overall yellow hue.

If filter 31 were similarly positioned, and were, as indicated above, an appropriately chosen magenta filter, the equation for the spectrum viewed in perforation 46 could be given as follows:

$$M=W-G$$

Thus, the magenta filter 31 will reduce transmission of the green portion of the spectrum, and will transmit the violet, blue, yellow, orange and red portions so as to transmit light through base perforation 47 having a magenta hue.

Filter element 30 may be similarly positioned and if appropriately chosen, as indicated above, to transmit light of a cyan hue, the equation for the spectrum viewed through base perforation 46 may be given as follows:

$$C=W-(V+Y+O+R)$$

Thus, the transmission of the violet, yellow, orange and red portions of the spectrum will be greatly reduced and the resultant light transmission through base perforation 47 will be of a cyan hue.

FIG. 20 illustrates the manner in which any two of the filters 30, 31 and 32 may be positioned over base perforations 46 and 47. For purposes of an exemplary showing, filter elements 31 and 32 are shown superposed over base perforations 46 and 47. Since filters 31 and 32 are respectively magenta and yellow, the equation for the spectrum viewed through base perforation 46 may be stated as follows:

$$M\times Y=W-(V+B+G)=Y+O+R$$

Thus, only the yellow, orange and red portions of the spectrum will be viewed through window 46 and the resultant hue of the light transmitted through window 47 will be overall red.

If filter elements 30 and 31 are positioned as shown in FIG. 20, the equation for the spectrum viewed in base perforation 46 would be as follows:

$$C\times M=W-(G+V+Y+O+R)=B$$

Thus, only the blue portion of the spectrum would be viewed through base perforation 46 and the light transmitted through base perforation 47 and the superposed filters would have a blue hue.

If filter elements 30 plus 32 were positioned as shown in FIG. 20, the equation for the spectrum viewed in base perforation 46 would be as follows:

$$C\times Y=W-(V+B+Y+O+R)=G$$

Thus, only the green portion of the spectrum would be viewed through base perforation 46, and the light transmitted by filters 30 and 32, as seen through base perforation 47, would have a green hue.

FIG. 21 illustrates the manner in which all three filters 30, 31 and 32 may be superposed over base perforations 46 and 47. When this is done, the equation for the spectrum viewed through window 46 would be as follows:

$$C\times M\times Y=W-(V+B+G+Y+O+R)=Bk$$

Thus, while the full spectrum of the white light can be seen through base perforation 45, superposition of all three filter elements over base perforation 46 will cut out or greatly reduce the transmission of all portions of the spectrum and no spectrum will be visible therethrough. As a consequence, no light (or substantially no light depending upon the quality of the filter elements) will be visible through the base perforation 47 and the three superposed filter elements will be opaque or black.

From the above description, it will be apparent that the embodiment of FIGS. 15–21 enables the graphic illustration of the subtractive phenomena. The spectrum of the light source may be viewed at any time through base prerforation 45 and diffraction grating 45*a*. That portion or portions of the spectrum transmitted by any one of the filter elements or any combination thereof may be viewed through base perforation 46 and diffraction grating 46*a*, and the hue of the light transmitted by any one of the filter elements or any combination thereof may be viewed through base perforation 47. In addition to this, the embodiment of FIGS. 15–21 may be used to perform all of the demonstrations described with respect to the embodiment of FIG. 1.

Modifications may be made in the embodiment of FIGS. 15–21 without departing from the spirit of the invention. For example, the filter elements 30, 31 and 32 may be provided with the simulated transmissivity charts described with respect to the embodiment of FIG. 10.

It is within the scope of the invention to eliminate perforations 35–37 and 39–44 if the embodiment of FIG. 15 is simply intended to illustrate the spectrum of a light source and the spectrum as modified by the filter elements individually or in combination. In such an instance base perforation 47 may also be eliminated if desired.

Another embodiment of the present invention is illustrated in FIGS. 22–25. In this embodiment, the demonstration device comprises a card or plaque-like means (generally indicated at 53) and having a plurality of perforations therein.

For purposes of an exemplary showing, the device 53 is illustrated as made up of a front element 54 and rear element 55. The front and rear elements may be made of any suitable material including card stock, plastic, or the like. While the material from which the elements 54 and 55 is made is not limiting, the elements are preferably opaque. Elements 54 and 55 may be of substantially the same dimensions and are provided with a plurality of matching perforations described hereinafter. The front and rear elements 54 and 55 are joined together by any suitable means with filter elements and diffraction grating means (to be described) located therebetween.

The device 53 is provided with a first perforation 56 extending through the elements 54 and 55. Between the elements 54 and 55 there is located a diffraction grating means which may be suitably affixed to either or both of the elements 54 and 55, and which covers the area of the perforation 56. When the device 53 is placed between the viewer and a source of light, the spectrum of the light may be viewed through the diffraction grating means in the perforation 56.

The device 53 has a first series of perforations 58–60, extending through the elements 54 and 55 and being of substantially the same size as the perforation 56. Adjacent each of the perforations 58–60 there is a smaller perforation 58*a*–60*a* respectively. The smaller perforations pass through both elements 54 and 55.

For purposes of an exemplary showing, the device 53 is illustrated as using three filter means, again transmitting light having the hues yellow, magenta and cyan. It will be understood by one skilled in the art that any filters may be used and any number of filters may be used. The number of holes such as 58–60 and 58*a*–60*a* will be equal to the number of different filters used. Again, the filters may be made of any suitable material. For purposes of an exemplary showing, filters made of material such as acetate or plastic sheeting incorporating appropriate dyes are illustrated.

Figure 23:
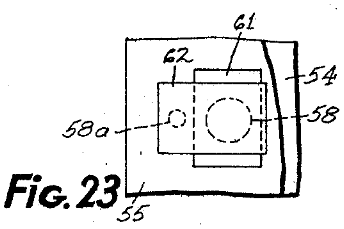
FIGS. 23, 24 and 25 are fragmentary elevational views of the embodiment of FIG. 22 with a portion of the base member broken away to illustrate various arrangements of filter elements and diffraction grating means.

FIG. 23 is a fragmentary view showing the device 53 in the area of the perforations 58 and 58*a*. The front element 54 is broken away. It will be noted that the perforation 58 in the rear element 55 is covered with a diffraction grating means 61 which does not cover the perforation 58*a*. A filter element 62 is so located as to overlie both the perforation 58 and the perforation 58*a* in the rear element 55. Thus it will be understood that light from a source viewed through perforation 58 will be modified by both the diffraction grating means 61 and the filter element 58*a* so that observation may be made therethrough of the spectrum of the light source as modified by the filter 58. Since only the filter 62 covers the perforation 58*a*, light viewed through that perforation will be modified by the filter element alone.

An identical arrangement of diffraction grating means and filter element will be made in the areas of the perforations 59–59*a* and 60–60*a*.

If for purposes of an exemplary showing the filters used in association with perforations 58–58*a*, 59–59*a* and 60–60*a* are respectively yellow, magenta and cyan, the light viewed through perforations 58*a*, 59*a* and 60*a* will be of a yellow, magenta and cyan hue respectively. This is indicated by the letters Y, M and C in FIG. 22. The spectrum viewed through perforation 58 may be stated as follows:

$$Y=W-(V+B)$$

The spectrum viewed through perforation 59 may be stated as follows:

$$M=W-G$$

The spectrum viewed through perforation 60 may be stated as follows:

$$C=W-(V+Y+O+R)$$

The device 53 has a second series of perforations 63, 64 and 65. These perforations extend through the front and rear elements 54 and 55 and may be of substantially the same size as the perforations 56, 58, 59 and 60. Adjacent each of the perforations 63–65 there are three perforations **63*a*–63*c*, 64*a*–64*c* and 65*a*–65*c* respectively. The last mentioned perforations pass through the front and rear elements 54 and 55 and are of smaller diameter such as the perforations 58*a*, 59*a* and 60*a***.

Figure 24:
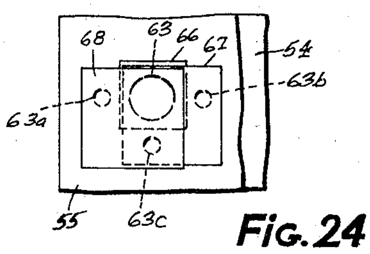

FIG. 24 is a fragmentary view of the device 53 in the area of the perforations 63 and **63*a*–63*c*. Front element 54 is broken away as indicated. The perforation 63 is covered with a diffraction grating means 66 which does not cover the perforations 63*a*–63*c*. A first filter element 67 is provided covering the perforation 63 and perforations 63*b* and 63*c*. A second filter element 68 is provided covering perforation 63 and perforations 63*a* and 63*c*. If, for purposes of an exemplary showing, filter element 67 is considered to be a magenta one and filter element 68 is considered to be a yellow one, it will be understood that light of a yellow hue will be viewed through perforation 63*a*, light of a magenta hue will be viewed through perforation 63*b* and light (modified by both filters) of a red hue will be viewed through perforation 63*c*. In this way, light modified by the individual filters and their combination may be viewed in the smaller perforations 63*a*–63*c*. In perforation 63**, the spectrum of the light source as modified by both filters may be observed, and may be stated by the following equation:

$$M\times Y=W-(V+B+G)=Y+O+R$$

It will be understood that a similar arrangement of a pair of filters and a diffraction grating means will be made in the areas of perforations 64 and **64*a*–64*c* and perforations 65 and 65*a*–65*c***.

Figure 22:
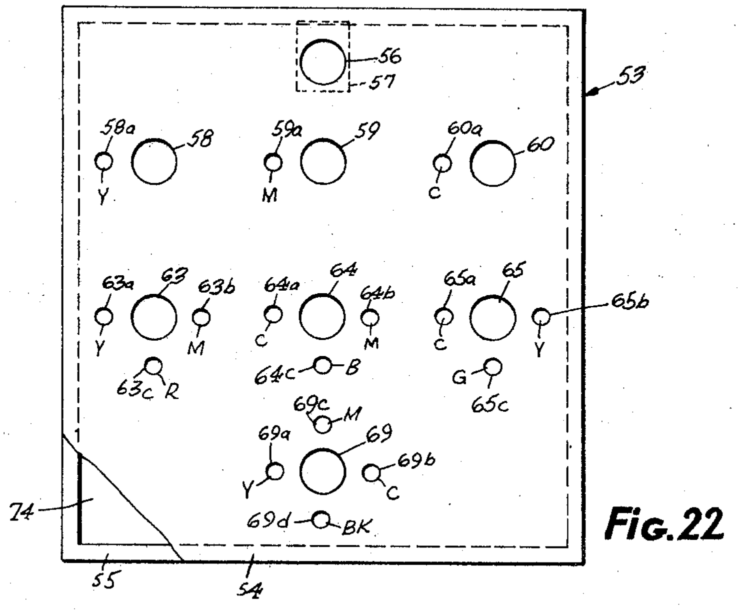
FIG. 22 is an elevational view of yet another embodiment of the demonstration device of the present invention with a portion of the base member broken away.

If for purposes of an exemplary showing cyan and magenta filters are used in the area of perforation 64, the filters may be so arranged that the cyan filter alone may be viewed through perforation **64*a*, the magenta filter alone may be viewed through perforation 64*b*, and the combination of the filters may be viewed through perforation 64*c*. Light through perforation 64*c* will have a blue hue as indicated in FIG. 22. The spectrum of the light source as modified by the cyan and magenta filters may be viewed through perforation 64** and may be stated by the following equation:

$$C\times M=W-(G+V+Y+O+R)=B$$

Thus, only the blue portion of the spectrum will be visible through the perforation 64.

If cyan and yellow filters are used in the area of perforation 65, they may be so arranged that the cyan filter alone may be viewed through perforation **65*a*, the yellow filter alone may be viewed through perforation 65*b*, and light modified by both filters may be viewed through perforation 65*c*. Light viewed through perforation 65*c*** will have a green hue as indicated in FIG. 22.

The spectrum of the light source, as modified by the cyan and yellow filters, may be viewed through perforation 65 and may be described by the following equation:

$$C\times Y=W-(V+B+Y+O+R)=G$$

Thus, only the green portion of the spectrum will be viewed through perforation 65.

Finally, the element 53 has a perforation 69 extending through front and rear elements 54 and 55 and which may have a diameter substantially equal to the perforation 56. A plurality of smaller perforations **69*a*–69*d* will be located adjacent the perforation 69 and will extend through both front and rear elements 54 and 55**. These smaller perforations may be of substantially the same diameter as the smaller perforations described above.

Figure 25:
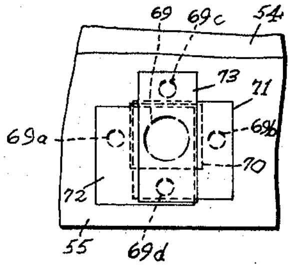

FIG. 25 is a fragmentary view of the device 53 in the area of the perforation 69 and the perforations **69*a*–69*d*. The front element 54** has been broken away as indicated.

A diffraction grating means 70 is positioned over the perforation 69, but does not cover the perforations **69*a*–69*d*. A first filter 71 is positioned to cover the perforation 69 and the perforations 69*b* and 69*d*. A second filter 72 is positioned to cover the perforation 69 and the perforations 69*a* and 69*d*. A third filter 73 is positioned to cover the perforation 69 and the perforations 69*c* and 69*d*. Thus it will be noted that each of the perforations 69*a*, 69*b* and 69*c* are covered by one only of the three filter elements. The perforation 69*d* is covered by all three filter elements, as is the perforation 69** which is further covered by the diffraction grating means.

If, for purposes of an exemplary showing, the filters 71, 72 and 73 are respectively considered to be cyan, yellow and magenta, it will be understood that light from a source viewed through perforations **69*a*, 69*b* and 69*c*** will appear respectively yellow, cyan and magenta.

Light viewed through the perforation **69*d* will be acted upon by all of the filters, and hence the perforation 69*d* will appear to be opaque or black. Similarly the spectrum viewed through perforation 69** may be described by the following equation:

$$C\times M\times Y=W-(V+B+G+Y+O+R)=Bk$$

Thus, the action of all three filter elements in the perforation 69 will be such as to cut out or greatly reduce the transmission of all portions of the spectrum and no spectrum will be visible therethrough.

From the above description it will be evident that the demonstration device 53 is capable of illustrating the spectrum of the light source viewed, the interaction of light from the source and the individual filter elements, the interaction of the individual filter elements on the spectrum of the light source, the action of pairs of the filters on light from the source, the action of pairs of the filters on the spectrum of the light source, and the action of the combination of all of the filters on light from the source and on the spectrum of the light source. In this way, the embodiment of FIGS. 22–25 is capable of making all of the demonstrations achievable by use of the embodiment of FIGS. 15–21.

While the device 53 is described as made up of front and rear elements 54 and 55, it will be understood that only the front element may be used, the use of a rear element 54 is preferred to prevent excessive handling and damage to the diffraction grating means and the filter elements. Instead of an individual diffraction grating means for each of the large holes, it is possible to provide a single diffraction grating means indicated in FIG. 22 at 74. In such an instance, the single diffraction grating means must be perforated in the areas of the small holes or perforations since only filter elements singly or in combination are to cover these holes. It will be understood that the number of large and small perforations will be dependent upon the number of different filter elements used. It will further be understood that the various perforations may be oriented in any convenient manner on the base members.

In the embodiments of FIGS. 15–21, as in the other embodiments of the demonstration device, the number of filter elements is not intended to constitute a limitation on the present invention.

It is also within the scope of the invention to provide the filter elements 30, 31 and 32 with tabs 50, 51 and 52 respectively (see FIG. 17). The tabs 50–52 not only permit easier handling of the individual filter elements, but also provide means whereby the filtering action of the individual filter elements may be observed. Thus, when tabs 50–52 are provided, holes 39–44 may be eliminated, if desired.

Modifications may be made in the invention without departing from the spirit of it.

The embodiments of the invention in which an exclusive property or privilege is claimed are defined as follows:

1. A color demonstration device comprising a plurality of color filter elements, each of said elements having a first series of holes equal in number to one less than the total number of said elements, said first series of holes being so located in said elements that when the elements are in juxtaposition areas will be formed thereon wherein a hole in all but one of said elements will coincide but will lack concidence with a hole in the remaining element, there being an area on said juxtaposed elements wherein each of said elements comprises said remaining element so that when said elements are juxtaposed as aforesaid light will be transmitted through and will be modified by the filtering action of all of said elements while the filtering action of each of said elements individually will be apparent in one of said areas.

2. The structure claimed in claim 1 wherein said elements have a second series of cooperating holes so located in said elements that when said elements are in juxtaposition areas will be formed thereon wherein light will be transmitted through a pair of said filter elements and a hole in the remaining filter elements, the number of said areas being equal to the number of possible pairs of said filter elements.

3. The structure claimed in claim 1 wherein there are three of the said filter elements transmitting respectively the colors cyan, magenta and yellow.

4. The structure claimed in claim 1 including means on each of said filter elements for indicating the transmittance of said filter means, said indicating means being so positioned as to coincide when said filter elements are in juxtaposition.

5. The structure claimed in claim 1 wherein said elements are pivoted together fan-wise.

6. The structure claimed in claim 1 including a base member, said base member having first and second perforations therein, diffraction grating means in association with said first and second perforations, said filter elements being superposable individually and in combination on said base member so as to cover said second perforation.

7. The structure claimed in claim 2 wherein there are three of said filter elements transmitting respectively the colors cyan, magenta and yellow, and wherein the visual appearance of red, green and blue is visible at said areas formed by said second series of holes.

8. The structure claimed in claim 2 including a base member, said base member having first and second perforations therein, diffraction grating means in association with said first and second perforations, said filter elements being superposable individually and in combination on said base member so as to cover said second perforation.

9. The structure claimed in claim 6 wherein said base member has a third perforation, said filter elements being superposable individually and in combination on said base member so as to cover said second and third perforations.

10. The structure claimed in claim 7 including means on each of said filter elements for indicating the transmittance of said filter means, said indicating means being so positioned as to coincide when said filter elements are in juxtaposition.

11. The structure claimed in claim 7 wherein said filter elements are sector shaped, said elements being pivoted together fan-wise.

12. The structure claimed in claim 7 wherein said filter elements are made from a material chosen from the class consisting of acetate, gelatin, glass and plastic.

13. The structure claimed in claim 7 wherein said second series of holes comprises a single hole in each element, said filter elements superposable fan-wise with said holes of said second series in incomplete coincidence whereby to produce a central clear area through which unmodified light will be transmitted and surrounding lunar shaped areas showing respectively the effects on light of the filter elements individually and in combinations of any two of them.

14. The structure claimed in claim 8 wherein said base member has a third perforation, said filter elements being superposable individually and in combination on said base member so as to cover said second and third perforations.

15. A demonstration device comprising at least two filter elements, means for causing said filter elements to assume a juxtaposed position, each of said elements having holes therein equal in number to one less than the total number of said filter elements, said holes in said filter elements being so spaced that when the filter elements are in juxtaposition areas will be formed thereon wherein a hole in all but one of said filter elements will coincide but will lack coincidence with a hole in the remaining filter element, there being an area on said juxtaposed filter elements wherein each of said filter elements comprises said remaining filter element so that when said filter elements are juxtaposed as aforesaid light will be transmitted through and will be modified by the filtering action of all of said filter elements while the filtering action of each of said filter elements individually will be apparent in one of said areas.

16. A color demonstration device comprising at least two filter elements, a base member having first and second perforations therein, diffraction grating means in association with said first and second perforations, said filter elements being superposable individually and in combination on said base member so as to cover said second perforation.

17. The structure claimed in claim 16 wherein said base member has a third perforation, said filter elements being superposable individually and in combination on said base member so as to cover said second and third perforations.

18. The structure claimed in claim 17 wherein said filter elements are pivotally affixed to said base member.

19. A device for demonstrating the interaction of light from a source and matter, said device comprising a base member, said base member having a first hole therein, diffraction grating means covering said first hole, said base having a first series of holes therein, diffraction grating means and a filter element covering each hole of said first series, said filter elements covering said holes of said first series differing from each other with respect to transmissivity, said holes of said first series being equal in number to the number of different filter elements used, an auxiliary hole adjacent each hole of said first series, each of said auxiliary holes covered by the filter element of said adjacent hole of said first series, a second series of holes, diffraction grating means and a pair of filter elements covering each hole of said second series, each of said pairs of filter elements comprising filter elements identical to two of said filter elements covering said holes of said first series, said holes of said second series being equal in number to the number of possible pairs of filter elements covering the holes of said first series, three auxiliary holes adjacent each of said holes of said second series, a first one of said last mentioned auxiliary holes covered by one of said pair of filter elements covering said adjacent hole of said second series, the second one of said last mentioned auxiliary holes covered by the other filter element of said last mentioned pair, the third one of said last mentioned auxiliary holes being covered by both filter elements of said last mentioned pair, said base member having a final hole therethrough, diffraction grating means and a plurality of filter elements covering said final hole, said last mentioned filter elements being identical to and equal in number to the filter elements covering the holes of said first series, a plurality of auxiliary holes adjacent said final hole, the number of said last mentioned auxiliary holes being one greater than the number of filter elements covering said final hole, one of said last mentioned auxiliary holes being covered by all of said last mentioned filter elements, and each remaining one of said last mentioned auxiliary holes being covered by a different one of said last mentioned filter elements.

References Cited

UNITED STATES PATENTS

| | | | |
|---|---|---|---|
| 1,528,621 | 3/1925 | Lavers | 35—28.3 |
| 1,704,605 | 3/1929 | Hintze | 35—28.3 |
| 2,253,107 | 8/1941 | Brooks | 35—28.5 |
| 3,069,788 | 12/1962 | Balinkin | 35—28.3 |
| 3,088,226 | 5/1963 | Watterson et al. | 35—28.3 |
| 3,365,816 | 1/1968 | Singerman | 35—28.3 |

OTHER REFERENCES

Creative Playthings catalogue of Princeton, N.J., 08540, copyright 1964, p. V only.

EUGENE R. CAPOZIO, *Primary Examiner.*

H. S. SKOGQUIST, *Assistant Examiner.*